(12) United States Patent
Li et al.

(10) Patent No.: US 8,903,335 B2
(45) Date of Patent: Dec. 2, 2014

(54) ELECTRONIC DEVICE

(71) Applicant: Alps Electric Co., Ltd., Tokyo (JP)

(72) Inventors: Xi Li, Miyagi-ken (JP); Tomotaka Suzuki, Miyagi-ken (JP); Makoto Sato, Miyagi-ken (JP); Hideharu Otake, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 146 days.

(21) Appl. No.: 13/790,710

(22) Filed: Mar. 8, 2013

(65) Prior Publication Data

US 2013/0189936 A1 Jul. 25, 2013

Related U.S. Application Data

(63) Continuation of application No. PCT/JP2011/068273, filed on Aug. 10, 2011.

(30) Foreign Application Priority Data

Sep. 22, 2010 (JP) .................................. 2010-212223

(51) Int. Cl.
| | | |
|---|---|---|
| *H04B 1/38* | (2006.01) | |
| *H04M 1/00* | (2006.01) | |
| *H01Q 1/44* | (2006.01) | |
| *H01Q 9/04* | (2006.01) | |

(52) U.S. Cl.
CPC ............... *H04B 1/3822* (2013.01); *H01Q 1/44* (2013.01); *H01Q 9/0421* (2013.01)
USPC .................... 455/90.3; 455/575.7; 455/575.9; 343/711; 343/860

(58) Field of Classification Search
USPC ............... 455/90.3, 550.1, 556.1, 557, 569.1, 455/569.2, 575.1, 575.7, 575.9; 343/711, 343/846, 860
See application file for complete search history.

(56) References Cited

U.S. PATENT DOCUMENTS

| | | | | |
|---|---|---|---|---|
| 6,614,398 | B2 * | 9/2003 | Kushihi et al. ......... | 343/700 MS |
| 7,397,430 | B2 * | 7/2008 | Harihara ...................... | 343/846 |
| 7,443,353 | B2 | 10/2008 | Fujimoto et al. | |
| 8,279,133 | B2 * | 10/2012 | Shimoda et al. ............. | 343/860 |

FOREIGN PATENT DOCUMENTS

| | | |
|---|---|---|
| JP | 2002-187489 | 7/2002 |
| JP | 2002-321575 | 11/2002 |

(Continued)

OTHER PUBLICATIONS

Search Report dated Nov. 15, 2011 from International Application No. PCT/JP2011/068273.

*Primary Examiner* — Quochien B Vuong
(74) *Attorney, Agent, or Firm* — Beyer Law Group LLP

(57) ABSTRACT

An electronic component (encoder) including an operation body is mounted on a circuit board. The electronic component causes a controller to perform processing in accordance with an operation input by the operation body. The mounting board includes a power-feeding leg piece connected to a wireless communication processor so that high frequency communication is allowed, a first short-circuiting leg piece that is adjacent to the power-feeding leg piece via a cut-out portion, and a second short-circuiting leg piece separated from the power-feeding leg piece. The short-circuiting leg pieces are connected to grounded portions. The impedance is adjusted by appropriately selecting the width or the depth of the cut-out portion. The resonance frequency is adjusted by appropriately selecting the size or the position of the short-circuiting leg piece. Thus, the mounting board operates as an inverted-F antenna in which the power-feeding leg piece functions as a power feeding portion.

4 Claims, 4 Drawing Sheets

(56) References Cited

FOREIGN PATENT DOCUMENTS

| JP | 2002-353713 | 12/2002 |
| JP | 2003-60415 | 2/2003 |
| JP | 2004-153625 | 5/2004 |
| JP | 2006-272998 | 10/2006 |

* cited by examiner

US 8,903,335 B2

ELECTRONIC DEVICE

CLAIM OF PRIORITY

This application is a Continuation of International Application No. PCT/JP2011/068273 filed on Aug. 10, 2011, which claims benefit of Japanese Patent Application No. 2010-212223 filed on Sep. 22, 2010. The entire contents of each application noted above are hereby incorporated by reference.

BACKGROUND OF THE INVENTION

1. Field of the Invention

The present invention relates to electronic devices that can perform an input operation using an operation portion and that can perform wireless communication. The present invention particularly relates to an electronic device having a wireless communication function suitable as, for example, an in-car electronic device.

2. Description of the Related Art

In recent years, some in-car electronic devices such as car navigation systems have been equipped with an antenna and a transmission-and-reception circuit (wireless communication processor) so as to have a wireless communication function with which the in-car electronic devices can form an in-car wireless LAN together with a device such as a mobile phone of a driver so as to be able to perform wireless communication with an external base station or the like.

For such an electronic device, the following technology has been developed. In order for the electronic device to perform wireless communication with devices, such as mobile phones at or around the driver's seat, with high sensitivity, an antenna is installed in a hazard switch operation button disposed in front of the driver's seat (see Japanese Unexamined Patent Application Publication No. 2002-187489, for example).

The following technology has been also developed for such electronic devices. An antenna is disposed at an end portion of a circuit board of an electronic device installed in an instrument panel so as to face a medium slot of the electronic device. With this technology, the electronic device can perform wireless communication with devices, such as mobile phones at or around the driver's seat, with high sensitivity. In addition, this technology eliminates the need for connection between a power feeding portion of the antenna and a transmission-and-reception circuit of the circuit board via a cable (see Japanese Unexamined Patent Application Publication No. 2006-272998, for example).

However, the technology disclosed by Japanese Unexamined Patent Application Publication No. 2002-187489 involves an operation of installing the antenna in the hazard switch operation button and an operation of drawing the cable from the power feeding portion of the antenna to the transmission-and-reception circuit. These operations are complicated and thus increase the cost of installation. The technology disclosed by Japanese Unexamined Patent Application Publication No. 2006-272998, on the other hand, does not involve connection between the power feeding portion of the antenna and the transmission-and-reception circuit via a cable. However, the antenna needs to be selectively positioned considering the positional relationship with the medium slot, thereby limiting the use of a particular area of the circuit board of the electronic device to installation of the antenna. This positioning requirement of the antenna prevents the circuit board from being further reduced in size.

SUMMARY OF THE INVENTION

The present invention provides an electronic device that has a wireless communication function and whose cost and size can be easily reduced without the need for an antenna to be installed therein and a cable to be drawn from a power feeding portion of the antenna.

An aspect of the present invention is claim 1

A mounting board of an electronic component including an operation portion is used to hold constituent elements or to be securely and firmly mounted on the circuit board. Thus, the mounting board is typically made of a metal plate that is easily bendable and electrically conductive and the mounting board is usually disposed near the operation portion that protrudes to the outside. Therefore, by feeding power to a predetermined portion of the mounting board, the mounting board can be caused to operate as an antenna that resonates in a specific frequency band. In addition, the impedance can be adjusted by appropriately selecting the width or the depth of the cut-out portion between the grounded first short-circuiting leg piece and the power-feeding leg piece (power feeding portion). Thus, the impedance can be matched such that the power feeding portion can reduce the return loss to a large extent. Consequently, there is no need to interpose a matching circuit between the mounting board (antenna) and the wireless communication processor. Furthermore, the mounting board can be caused to function as an antenna that resonates in a desired frequency band since the resonance frequency is adjustable by appropriately selecting the size and the position of the grounded second short-circuiting leg piece. Thus, by using the electronic component that also has an antenna function, an electronic device is obtained that has a wireless communication function and that has high sensitivity for wireless communication in a desired frequency band without the need for a special antenna or a matching circuit. In the case where the constituent elements of the electronic component that also functions as an antenna include an electrically conductive element that is in contact with the mounting board, such as a metal outer case member, the electrically conductive element can be also caused to operate as part of the antenna.

In the above configuration, the number of first short-circuiting leg pieces is not particularly limited. However, for easy adjustment of the impedance, it is preferable to provide a pair of first short-circuiting leg pieces such that the first short-circuiting leg pieces are positioned substantially symmetrically with respect to a line passing through the power-feeding leg piece.

In the above configuration, the number of second short-circuiting leg pieces is not particularly limited. However, for easy adjustment of the resonance frequency, it is preferable to provide a pair of second short-circuiting leg pieces such that the second short-circuiting leg pieces are positioned substantially symmetrically with respect to a line passing through the power-feeding leg piece.

In the above configuration, for easy designing and processing, it is preferable that the mounting board has a simple shape such that the mounting board has a substantially square shape when viewed in plan, a power-feeding leg piece and a first short-circuiting leg piece are formed in a portion that is on one of substantially parallel sides of the mounting board and that is bent toward the circuit board and a second short-circuiting leg piece is formed in a portion that is on the other side of the mounting board and that is bent toward the circuit board.

The present invention has been made by focusing on an electrically conductive mounting board being often used in an electronic component that includes an operation portion. In the invention, the mounting board is caused to operate as an antenna by forming a power-feeding leg piece at a predetermined position of the mounting board, by feeding power to the power-feeding leg piece, by forming a first short-circuiting leg piece for impedance adjustment and a second short-circuiting leg piece for resonance frequency adjustment at appropriate positions of the mounting board, and by grounding the first and second short-circuiting leg pieces. By using the electronic component that also functions as an antenna, an electronic device is obtained that has a wireless communication function and that has high sensitivity for wireless communication in a desired frequency band without the need for a special antenna or a matching circuit. Consequently, there is no need to install an antenna or to draw a cable from the power feeding portion, thereby saving the space for the antenna or the matching circuit. Thus, the cost and the size of the electronic device having a wireless communication function can be easily reduced.

DESCRIPTION OF THE PREFERRED EMBODIMENTS

Figure 1:
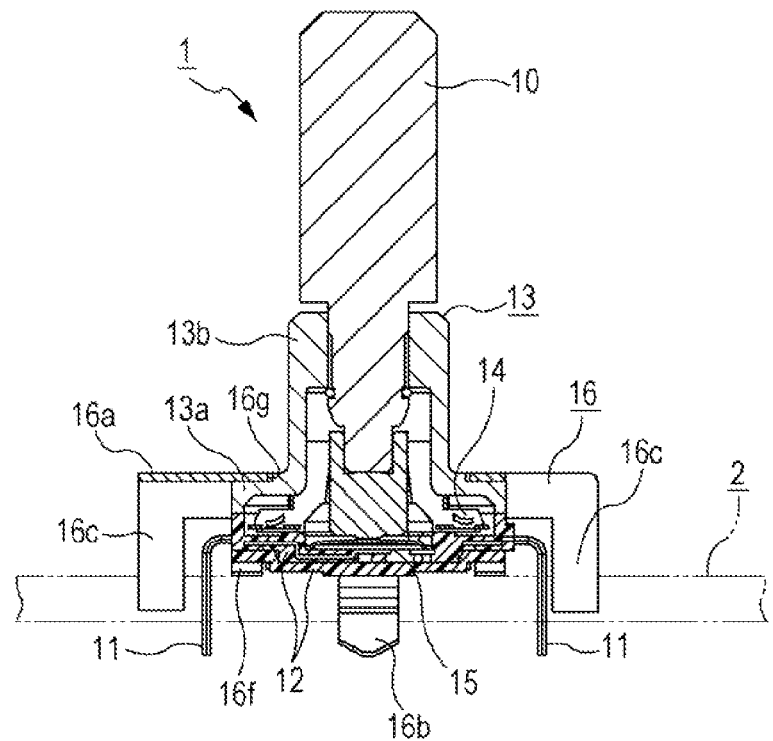
FIG. 1 is a cross sectional view of an encoder that also functions as an antenna used as an example of an electronic device according to a first embodiment of the present invention.

Referring to the drawings, electronic devices according to embodiments of the present invention will be described below. Firstly, an electronic device according to a first embodiment is described with reference to FIGS. 1 to 5. The electronic device according to the first embodiment is an in-car electronic device, such as a car navigation system, in which multiple operation portions are disposed at such positions of a car as to be operable by users in the car. One of the multiple operation portions is an operation body 10 of the encoder 1 illustrated in FIG. 1 and FIGS. 3 to 5.

Figure 2:
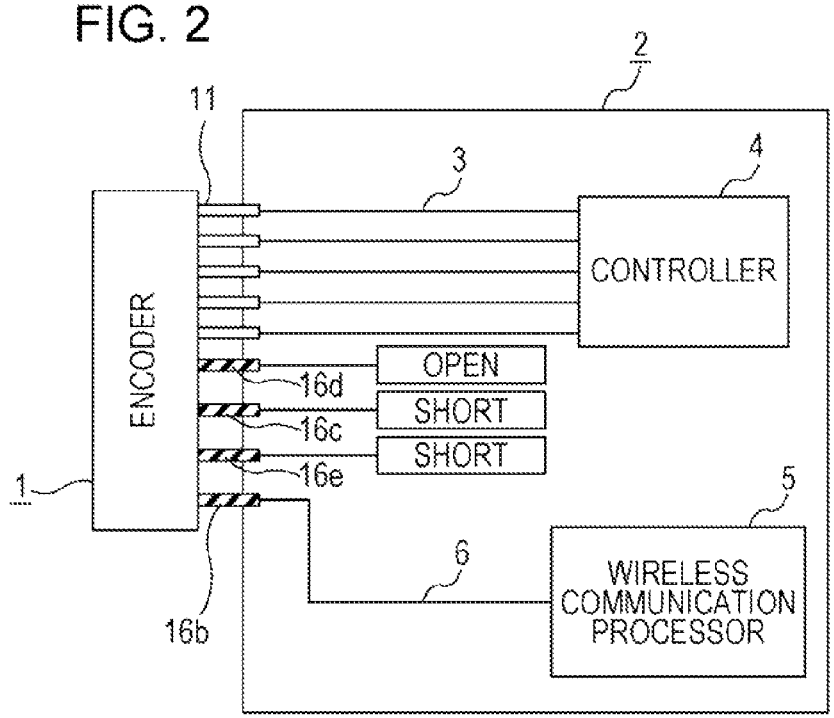
FIG. 2 is a block diagram illustrating how the encoder is connected to a main body of the electronic device according to the first embodiment.

As illustrated in FIG. 1, the encoder 1 is mounted on a circuit board 2. As illustrated in FIG. 2, multiple external connection terminals 11 of the encoder 1 are electrically connected to a controller 4 via corresponding wiring patterns 3 on the circuit board 2. The controller 4 is disposed on the circuit board 2. When a user manually operates the operation body 10 of the encoder 1, the controller 4 performs processing corresponding to the input operation. Additionally, a wireless communication processor 5, which is a transmission-and-reception circuit, is disposed on the circuit board 2 so that wireless communication for an in-car wireless LAN can be performed.

The encoder 1 includes a synthetic resin base board 12, an outer case 13, and a mounting board 16. The base board 12 is formed by insert-molding so as to hold the multiple external connection terminals 11. The outer case 13 is mounted on and fixed to the base board 12. The mounting board 16 integrates the outer case 13 and the base board 12 together. As illustrated in FIG. 1, a first detector 14 and a second detector 15 are installed in an internal cavity defined by the outer case 13 and the base board 12 of the encoder 1. The first detector 14 detects a change of the rotary position of the operation body 10 and the second detector 15 detects that the operation body 10 is pushed. External connection terminals 11 are individually drawn from the first and second detectors 14 and 15.

The operation body 10 has a columnar shape. An operation knob, not illustrated, is fitted around the operation body 10. The outer case 13 includes a flange portion 13a disposed on the base board 12 and a cylindrical portion 13b that stands on the flange portion 13a. The flange portion 13a, together with the base board 12, is held by the mounting board 16. The cylindrical portion 13b supports the operation body 10 such that the operation body 10 can be rotated or pushed.

The mounting board 16 is formed by bending an electrically conductive metal plate and is substantially rectangular when viewed in plan. The mounting board 16 includes a top plate portion 16a, a power-feeding leg piece 16b, two first short-circuiting leg pieces 16c, a mount leg piece 16d, a second short-circuiting leg piece 16e, and four locking tabs 16f. The top plate portion 16a is substantially rectangular. The power-feeding leg piece 16b and the two first short-circuiting leg pieces 16c (see FIG. 3) are disposed in a portion that is bent toward the circuit board 2 and on one long side of the top plate portion 16a. The mount leg piece 16d and the second short-circuiting leg piece 16e (see FIG. 4) are disposed in a portion that is bent toward the circuit board 2 and on the other long side of the top plate portion 16a. The four locking tabs 16f are disposed on both widthwise sides of the power-feeding leg piece 16b and both widthwise sides of the mount leg piece 16d. Each locking tab 16f is fixed to the base board 12 by locking. The top plate portion 16a has an escape hole 16g through which the cylindrical portion 13b of the outer case 13 penetrates.

The power-feeding leg piece 16b of the mounting board 16 is positioned between the two first short-circuiting leg pieces 16c. As illustrated in FIG. 2, by connecting the power-feeding leg piece 16b to the wireless communication processor 5 via a transmission line 6 so as to allow high frequency communication, a power feed signal is supplied to the power-feeding leg piece 16b and the mounting board 16 can be caused to operate as an antenna that resonates in a specific frequency band.

Figure 3:
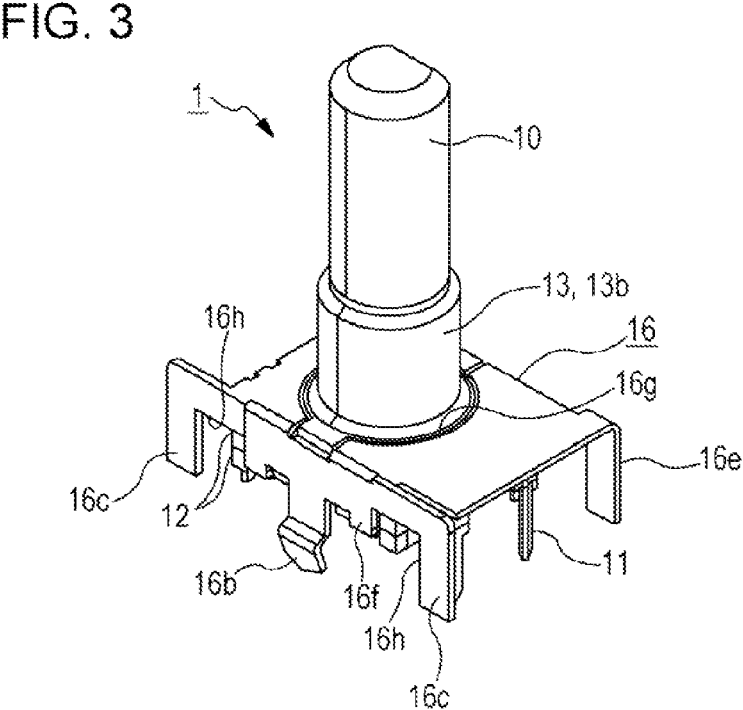
FIG. 3 is a perspective view of the encoder illustrated in FIG. 1 when viewed from one direction.
Figure 4:
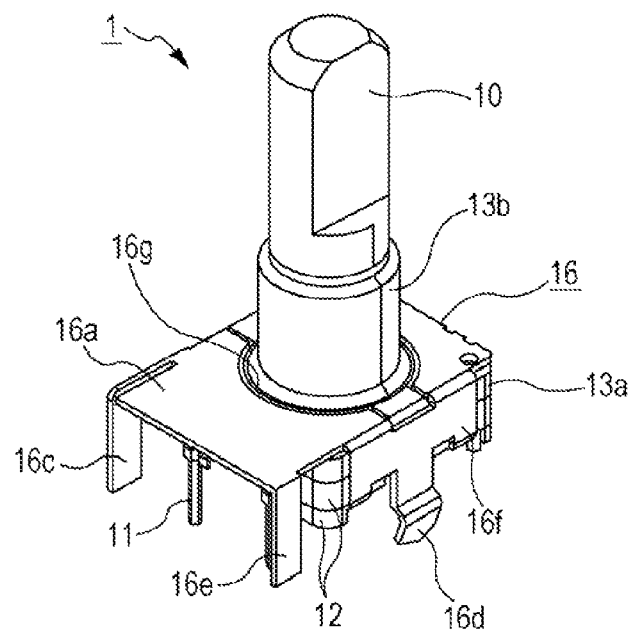
FIG. 4 is a perspective view of the encoder illustrated in FIG. 1 when viewed from another direction.
Figure 5:
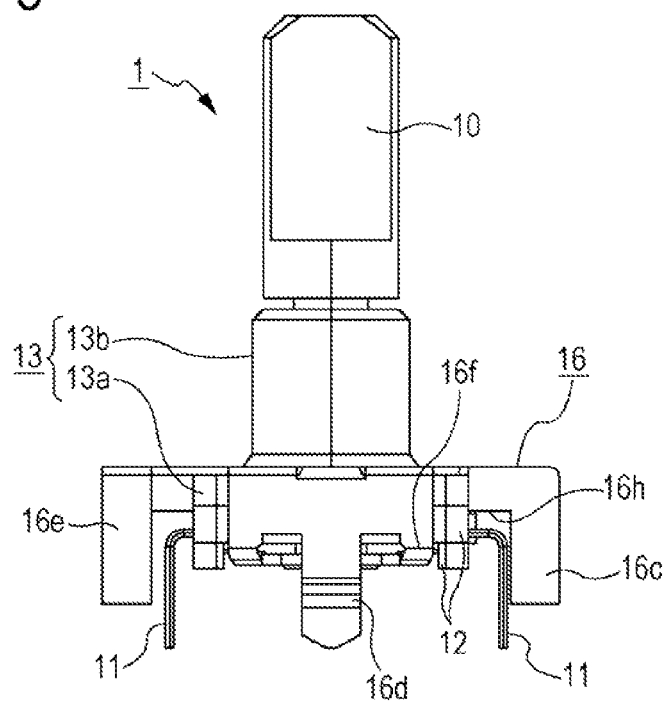
FIG. 5 is a side view of the encoder illustrated in FIG. 1.

The first short-circuiting leg pieces 16c and the second short-circuiting leg piece 16e of the mounting board 16 are connected to grounded conductors (grounded portions), not illustrated, disposed on the circuit board 2. As illustrated in FIG. 3, each of the first short-circuiting leg pieces 16c is adjacent to the power-feeding leg piece 16b with a cut-out portion 16h interposed therebetween. The impedance can be adjusted by appropriately selecting the width or the depth of the cut-out portion 16h and thus the impedance can be matched such that the power feeding portion (power-feeding leg piece 16b) reduces a return loss to a large extent. Thus, there is no need to interpose a matching circuit between the power-feeding leg piece 16b and the wireless communication processor 5. The second short-circuiting leg piece 16e, on the other hand, is separated from the power-feeding leg piece 16b by a distance larger than a distance between the power-feeding leg piece 16b and each first short-circuiting leg piece 16c. The resonance frequency can be adjusted by appropriately selecting the size and the position of the second short-circuiting leg piece 16e and thus the mounting board 16 can be caused to operate as an antenna that resonates in a desired frequency band (2.4-GHz band, for example).

The mount leg piece 16d of the mounting board 16 is soldered to an electrically isolated land of the circuit board 2 (not illustrated). In other words, the mount leg piece 16d is used to firmly and stably mount the encoder 1 on the circuit board 2 but is electrically open (see FIG. 2). In this embodiment, the mount leg piece 16d and the power-feeding leg piece 16b have substantially the same shape and are positioned substantially symmetrically because one of the mount leg pieces positioned substantially symmetrically is used as a power-feeding leg piece 16b. The four locking tabs 16f of the mounting board 16 are bent into an L shape and are fixed by locking to portions around four corners of the bottom surface of the base board 12. In other words, the base board 12, which is in a multilayered state, and the flange portion 13a are held by being sandwiched between the top plate portion 16a and the locking tabs 16f of the mounting board 16. Consequently, the base board 12, the outer case 13, and the mounting board 16 are integrated together.

In the electronic device configured in the above manner, the mounting board 16 operates as an inverted-F antenna that resonates in a predetermined frequency band by using the power-feeding leg piece 16b of the mounting board 16 of the encoder 1 as a power feeding portion and by disposing the first short-circuiting leg pieces 16c for impedance adjustment and the second short-circuiting leg piece 16e for resonance frequency adjustment at appropriate positions of the mounting board 16. Specifically, it has been confirmed that the mounting board 16 of the encoder 1 according to the embodiment can resonate in the 2.4-GHz band, which is suitable for short distance wireless communication such as Bluetooth (registered trademark). If the outer case 13 that is in contact with the mounting board 16 is made of an electrically conductive material, the outer case 13 can also be caused to operate as part of an antenna. In this embodiment, in order to facilitate impedance adjustment, the encoder 1 includes two first short-circuiting leg pieces 16c positioned substantially symmetrically with respect to a line passing through the power-feeding leg piece 16b. However, the impedance can be adjusted even when the encoder 1 includes only one first short-circuiting leg piece 16c.

As described above, in the encoder 1 used as the electronic device according to the embodiment, the mounting board 16 can be caused to operate as an antenna that resonates in a predetermined frequency band because the power-feeding leg piece 16b is formed at a predetermined position of the mounting board 16 to serve as a power feeding portion. Moreover, there is no need to interpose a matching circuit between the power feeding portion and the wireless communication processor 5 because the impedance can be adjusted by appropriately selecting the width or the depth of the cut-out portion 16h between each grounded first short-circuiting leg piece 16c and the power feeding portion (power-feeding leg piece 16b). Furthermore, the mounting board 16 can be caused to operate as an antenna that resonates in a desired frequency band because the resonance frequency can be adjusted by appropriately selecting the size or the position of the grounded second short-circuiting leg piece 16e. Thus, by using the encoder 1 that also functions as an antenna, an electronic device can be formed that has a wireless communication function and that has high sensitivity for wireless communication in a desired frequency band (2.4-GHz band, for example) without the need for a special antenna or a matching circuit. Consequently, there is no need to install an antenna or to draw a cable from the power feeding portion, thereby saving the space for the antenna or the matching circuit. Thus, the cost and size of the electronic device having a wireless communication function can be reduced.

Typical electronic components such as encoders include a mounting board made of a metal plate to hold constituent elements or to be securely and firmly mounted on the circuit board. Thus, the encoder 1 according to this embodiment can additionally have an antenna function without its structure being made particularly complicated.

Figure 6:
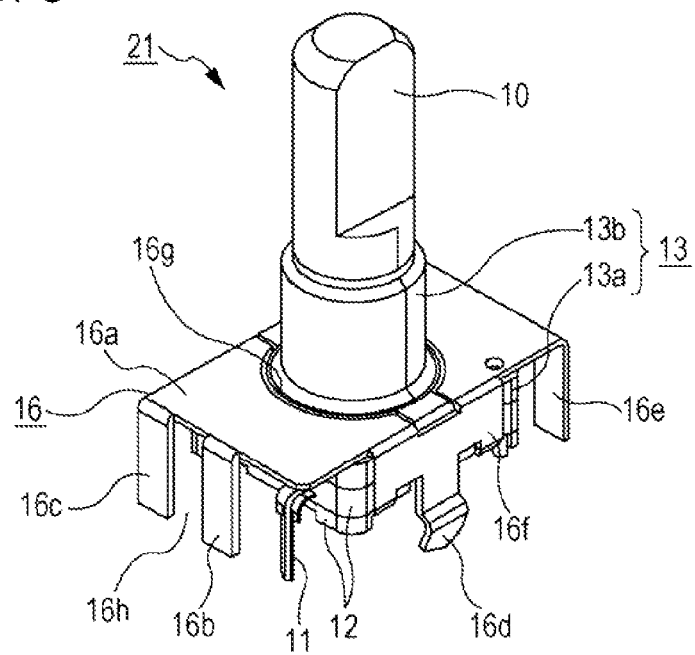
FIG. 6 is a perspective of an encoder that also functions as an antenna and that is used as an example of an electronic device according to a second embodiment of the present invention.
Figure 7:
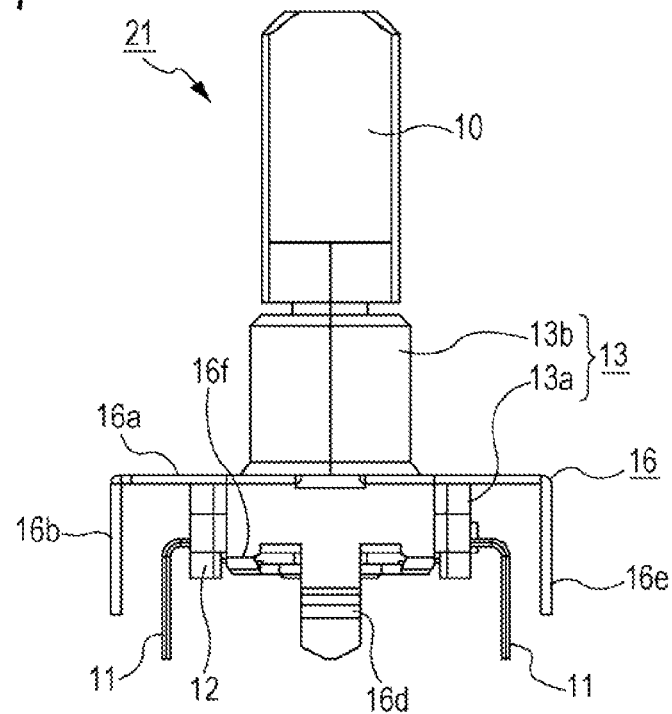
FIG. 7 is a side view of the encoder illustrated in FIG. 6.
Figure 8:
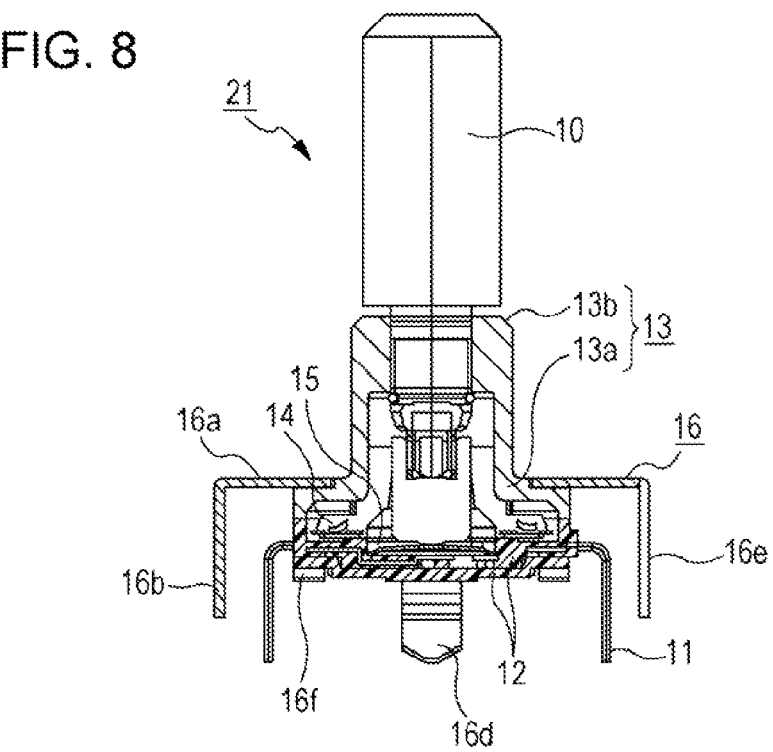
FIG. 8 is a cross sectional view of the encoder illustrated in FIG. 6.

Referring now to FIGS. 6 to 8, a second embodiment of the present invention will be described. In these drawings, components that are the same as those described in the first embodiment and illustrated in FIGS. 1 to 5 are denoted by the same reference numerals and will not be described here.

An encoder 21 according to the second embodiment illustrated in FIGS. 6 to 8 differs from the encoder 1 according to the first embodiment to a large extent with regard to the positions of the power-feeding leg piece 16b and the first and second short-circuiting leg pieces 16c and 16e. Specifically, the encoder 21 according to the second embodiment includes a power-feeding leg piece 16b and a first short-circuiting leg piece 16c, which are formed in a portion that is bent so as to hang from one short side of a top plate portion 16a of the mounting board 16, and two second short-circuiting leg pieces 16e, which are formed in a portion that is bent so as to hang from the other short side of the top plate portion 16a. The encoder 21 also includes a mount leg piece 16d and two locking tabs 16f in a bent portion on one long side of the top plate portion 16a and includes another mount leg piece 16d and two locking tabs 16f in a bent portion on the other long side of the top plate portion 16a. In this manner, the power-feeding leg piece 16b can be positioned as desired so as to be suitable for feeding power to the mounting board 16. In accordance with the position of the power-feeding leg piece 16b, the first short-circuiting leg piece 16c and the second short-circuiting leg pieces 16e can be positioned appropriately. Although the encoder 21 according to the second embodiment includes only one first short-circuiting leg piece 16c for impedance adjustment, the encoder 21 includes two second short-circuiting leg pieces 16e for easy adjustment of resonance frequency, which are positioned substantially symmetrically with respect to a line passing through the power-feeding leg piece 16b. In this manner, the number of first short-circuiting leg pieces 16c or second short-circuiting leg pieces 16e can be appropriately selected.

In the embodiments described above, an encoder is taken as an example of the electronic component that also functions as an antenna. However, in the case of employing an electronic component other than an encoder (such as a push switch or a variable resistor) whose mounting board is caused to function as an antenna, the fundamental structure of the electronic component may be the same as that of each of the encoders according to the embodiments. When the frequency band to be supported is not the 2.4-GHz band, the band can be supported by changing the size or the position of the second short-circuiting leg piece 16e or by changing the width or the depth of each cut-out portion 16h. The present invention is also applicable to an electronic device other than an in-car electronic device. Nevertheless, as described in the first embodiment, if an operation body 10 is disposed at such a position of a car as to be operable by users in the car, the electronic device is more practical because the electronic device can form an in-car wireless LAN together with devices such as mobile phones of the users.

What is claimed is:

1. An electronic device having a wireless communication function, the device comprising:

an electronic component including at least an operation portion, an external connection terminal, and an electrically conductive mounting board;

a circuit board on which the electronic component is mounted;

a controller configured to perform processing in accordance with an operation input from the operation portion; and a wireless communication processor configured to process a radio signal, wherein the mounting board includes:

a power-feeding leg piece, a first short-circuiting leg piece for impedance adjustment, provided adjacent to the power-feeding leg piece with a cut-out portion interposed therebetween, the first short-circuiting leg piece being separated from the power-feeding leg piece by a first distance; and a second short-circuiting leg piece for resonance frequency adjustment, the second short-circuiting leg piece being separated from the power-feeding leg piece by a second distance greater than the first distance, and wherein the power-feeding leg piece is connected to the wireless communication processor so as to allow high frequency communication, and the first short-circuiting leg piece and the second short-circuiting leg piece are connected to grounded portions, such that the mounting board operates as an antenna, the power-feeding leg piece being a power feeding portion for the antenna.

2. The electronic device according to claim 1, wherein the first short-circuiting leg piece is one of a pair of first short-circuiting leg pieces positioned substantially symmetric with respect to a line passing through the power-feeding leg piece.

3. The electronic device according to claim 1, wherein the second short-circuiting leg piece is one of a pair of second short-circuiting leg pieces positioned substantially symmetric with respect to a line passing through the power-feeding leg piece.

4. The electronic device according to claim 1, wherein the mounting board has a substantially square shape in a plan view and has first and second substantially parallel sides each having a bent portion bent toward the circuit board, the power-feeding leg piece and the first short-circuiting leg piece are formed in the bent portion on the first side, and the second short-circuiting leg piece is formed in the bent portion on the second side.

* * * * *